United States Patent
Watson

[11] 3,864,470
[45] Feb. 4, 1975

[54] VISUALLY CLEAR TOOTHPASTE CONTAINING A SYNTHETIC PRECIPITATED HYDRATED SILICA

[75] Inventor: Charles Andrew Watson, Ruislip, England

[73] Assignee: Lever Brothers Company, New York, N.Y.

[22] Filed: July 16, 1973

[21] Appl. No.: 379,295

[30] Foreign Application Priority Data
July 21, 1972 Great Britain.................... 34358/72

[52] U.S. Cl. .................................................. 424/49
[51] Int. Cl............................................. A61k 7/16
[58] Field of Search ................................ 424/49–58

*Primary Examiner*—Richard L. Huff
*Attorney, Agent, or Firm*—Lever Brothers Company

[57] ABSTRACT

A visually clear toothpaste containing a particulate polishing agent, characterised in that the polishing agent is synthetic hydrated precipitated silica.

2 Claims, No Drawings

VISUALLY CLEAR TOOTHPASTE CONTAINING A SYNTHETIC PRECIPITATED HYDRATED SILICA

This invention relates to toothpastes, more particularly to toothpastes which are visually clear, i.e., substantially translucent or transparent.

The use of silica xerogels as the cleaning and polishing agent of visually clear dentifrices has been disclosed in British Patent Specification No. 1,264,292.

More recently, in Netherlands Patent Application No. 7,112,989, it has been proposed to use certain complex sodium aluminosilicate salts as the polishing agent of visually clear dentifrices.

In Application Ser. No. 294,419 there is described the use of silica-alumina xerogels as the abrasive cleaning agent of translucent and transparent toothpastes. Such silica-alumina materials have previously been used as cracking catalysts. They can be derived from sodium aluminosilicate by exchanging the sodium for hydrogen (see "The Colloid Chemistry of Silica and Silicates" by Ralph K. Iler, 1955, page 184).

In British Patent Application No. 34359/72 there is described the use of a different kind of material but also containing silica and aluminium, namely a co-precipitate of silica and aluminium hydroxide having an $SiO_2:Al_2O_3$ molar ratio of 24 to 6:1, as the cleaning and polishing agent of translucent and transparent toothpastes.

Our research into the use of the above aluminosilicates, silica-alumina and co-precipitated materials has revealed that although they do enable one to formulate translucent and transparent abrasive-containing toothpastes, the degree of clarity of such toothpastes is limited and they do not appear to permit the obtaining of products of the high degree of clarity that is obtainable using silica xerogels as the abrasive cleaning agent. We have found that this is due to the presence of aluminium in such materials. This finding has led us to appreciate that one can also achieve the high degree of clarity obtainable with silica xerogels through the use of synthetic hydrated precipitated silica.

Accordingly the present invention relates to a visually clear toothpaste which contains a synthetic hydrated precipitated silica as the polishing agent and a liquid phase of substantially the same refractive index as the precipitated silica.

This synthetic hydrated precipitated silica is not a silica gel, xerogel or aerogel, but is obtained as a finely divided precipitate, such as from a solution of alkali metal silicate and acid. The variables of concentration, pH and temperature are chosen to prevent the formation of a gelatinous mass and to promote the precipitation of silica in a finely divided form which can be readily filtered and washed (for details on the production of finely divided silica precipitates and the difference between them and silica gels, reference is made to The Colloid Chemistry of Silica and Silicates, by Ralph K. Iler, 1955, particularly page 130 and the section commencing on page 159 entitled "Preparation by Precipitation from Aqueous Solution").

Precipitated silica is less abrasive than silica xerogels and thus permits the formulation of clear toothpastes of relatively mild abrasiveness which some users may prefer.

The synthetic precipitated silica may have an average aggregate particle size of 2 to 30 microns, preferably 5 to 25 microns, and is desirably present in an amount of 5 to 50 percent by weight, preferably 10 to 40 percent by weight, of the toothpaste.

The composition of the liquid phase of the toothpaste should be so adjusted that its refractive index is substantially the same as the refractive index of the precipitated silica (which is about 1.45) whereby the precipitate is invisible and the toothpaste therefore visually clear. The liquid phase of the toothpaste will be constituted primarily by humectant material and water. Humectants commonly used are glycerine, sorbitol syrup and polyethylene glycol. The liquid phase will usually amount to about 50 to 90 percent by weight of the toothpaste.

The visually clear toothpaste of the invention may contain other ingredients known to those skilled in the art. Thus there may be present a thickening agent, such as a pyrogenic silica, silica aerogel or synthetic inorganic silicate clay such as the synthetic clay sold under the trademark Laponite as Laponite CP and Laponite SP and having the formula $[Si_8Mg_{5.1}Li_{0.6}-H_{7.6}O_{24}]_{0.6}Na_{0.6}$. Small proportions of an organic hydrocolloid thickener may also be used.

The toothpaste may also include a sweetening agent, flavouring agent, fluorine-containing material e.g., sodium fluoride or sodium monofluorophosphate, antibacterial agent e.g., 1,6-di-(p-chlorophenyl biguanido) hexane and its salts, preservative or colouring agent. The toothpaste may also include materials to give various visual effects, such as coloured or iridescent particles.

The following Example of a transparent toothpaste illustrates the invention. Percentages are by weight.

| Ingredients | % |
| --- | --- |
| Synthetic precipitated silica | 18.00 |
| Sorbitol syrup | 65.67 |
| Sodium carboxymethylcellulose | 0.70 |
| Sodium lauryl sulphate | 1.50 |
| Saccharin | 0.20 |
| Polyethylene glycol 1540 | 2.00 |
| Flavour | 1.25 |
| Chloroform | 0.80 |
| Colourant (4% solution) | 0.88 |
| Water | 9.00 |

The synthetic precipitated silica used in this formula is the material commercially available under the tradename NEOSYL, a product of Joseph Crosfield & Sons Limited, Warrington, Lancashire. The precipitated silica had a moisture content of 12 percent (loss on ignition) and an average aggregate particle size of about 10 microns. The refractive index of the toothpaste was 1.450.

This toothpaste had a high degree of transparency. Its transparency was superior to the best that could be obtained using a material containing silica interbonded with alumina or a co-precipitate of silica and aluminium hydroxide.

The abrasive power of the above toothpaste may be increased by replacing a part of the precipitated silica by a silica xerogel such as described in British Specifications Nos. 1,186,706 and 1,264,292.

What is claimed is:

1. A visually clear toothpaste comprising a particulate solid polishing agent and a liquid phase of substantially the same refractive index as the polishing agent, characterised in that the polishing agent comprises a synthetic precipitated hydrated silica of average aggregate particle size of from about 2 to about 30 microns, said synthetic precipitated hydrated silica being present in an amount of from about 5 to about 50 percent by weight of the toothpaste.

2. A toothpaste according to claim 1, wherein the synthetic precipitated hydrated silica has an average aggregate particle size of about 10 microns and a refractive index of 1.45.

* * * * *